United States Patent [19]

Matsumoto

[11] Patent Number: 4,956,804
[45] Date of Patent: Sep. 11, 1990

[54] DATA PROCESSING SYSTEM WITH MEMORIES ACCESS TIME COUNTING AND INFORMATION PROCESSOR WAIT SIGNAL GENERATING CIRCUITRIES

[75] Inventor: Kozo Matsumoto, Tokyo, Japan

[73] Assignee: Canon Kabushiki Kaisha, Tokyo, Japan

[21] Appl. No.: 282,890

[22] Filed: Dec. 12, 1988

Related U.S. Application Data

[63] Continuation of Ser. No. 690,643, Jan. 11, 1985.

[30] Foreign Application Priority Data

Jan. 20, 1984 [JP] Japan .................................. 59-7057
Jan. 20, 1984 [JP] Japan .................................. 59-7058

[51] Int. Cl.⁵ .......................... G06F 7/62; G06F 9/02; G06F 13/14; G06F 15/08
[52] U.S. Cl. ................................. 364/900; 364/966.1; 364/966.6; 364/967.3; 364/942.7; 364/934; 364/934.2; 364/964; 364/950.4; 364/939.4; 364/947.2; 340/799; 377/15; 377/37
[58] Field of Search ... 364/200 MS File, 900 MS File; 340/799; 377/15, 37

[56] References Cited

U.S. PATENT DOCUMENTS

| | | | |
|---|---|---|---|
| Re. 30,671 | 7/1981 | Poland | 364/200 |
| 4,014,006 | 3/1977 | Sorensen et al. | 364/200 |
| 4,034,352 | 7/1977 | Hotchkiss | 364/900 |
| 4,091,446 | 5/1978 | Demonote | 364/200 |
| 4,159,517 | 1/1979 | Paradine | 364/200 |
| 4,217,637 | 8/1980 | Faulkner et al. | 364/200 |
| 4,258,430 | 3/1981 | Tyburski | 364/900 |
| 4,414,664 | 11/1983 | Greenwood | 364/200 |
| 4,429,368 | 1/1984 | Kurii | 364/200 |
| 4,432,051 | 2/1984 | Bogaert et al. | 364/200 |
| 4,484,330 | 11/1984 | Moy | 377/37 |
| 4,494,196 | 1/1985 | Greer | 364/200 |

Primary Examiner—Archie E. Williams, Jr.
Assistant Examiner—Emily Y. Chan
Attorney, Agent, or Firm—Fitzpatrick, Cella, Harper & Scinto

[57] ABSTRACT

An electronic equipment has a central processing unit (CPU), a first memory accessable by the CPU, a first setting circuit for holding a signal representative of a rated access time of the first memory and a removable auxiliary memory which includes a second memory accessable by the CPU and a second setting circuit for holding a signal representative of a rated access time of the second memory.

8 Claims, 4 Drawing Sheets

DATA PROCESSING SYSTEM WITH MEMORIES ACCESS TIME COUNTING AND INFORMATION PROCESSOR WAIT SIGNAL GENERATING CIRCUITRIES

This application is a continuation of application Ser. No. 690,643 filed Jan. 11, 1985.

BACKGROUND OF THE INVENTION

1. Field of the Invention

The present invention relates to an electronic equipment having a microprocessor and a memory, and more particularly to an electronic equipment suitable for use as a laser beam printer, a facsimile machine and so on.

2. Description of the Prior Art

The development of electronic technology in recent years has been remarkable. Since an IC device is highly integrated, high performance electronic equipment such as a personal computer, a word processor, an office computer, a facsimile machine and a laser beam printer can be attained with a small size and a low cost.

On the other hand, as electronic technology develops, electronic equipment is used in various fields and the manners in which it may be used are versatile. As a result, a single type of electronic equipment is required to have various specifications, and performances depending on the manner of its use. If an equipment which meets all of those requirements is manufactured and furnished, it may be an overperformance product to a certain user and hence a low cost-performance product.

In order to resolve the above problem, the following solution is usually used. The main unit of electronic equipment has only the essential basic functions, and other auxiliary electronic equipment, such as an expansion memory or an expansion character generator, is connected thereto depending on the user specification. It is called a ROM cartridge or RAM cartridge and used to expand the function of the main unit of electronic equipment, expand types of character fonts or expand a RAM which temporarily stores data.

FIG. 1 shows a functional configuration of a prior art electronic equipment. It mainly shows a memory access function. Numeral 1 denotes a main unit of an electronic equipment such as a personal computer, which includes a central processing unit (CPU) 101 for controlling the electronic equipment, and an internal memory 102 including a ROM for storing a control program and a RAM. Numeral 103 denotes a wait signal generator which generates a wait signal on a line 104 to temporarily suppress memory accessing by the CPU 101. Usually, when the CPU reads or writes into the memory, the CPU is caused to wait for a predetermined time period for each memory accessing in order to match a memory access time (memory cycle) to a CPU control speed so that the CPU retrieves a data after the read data has become fully effective or the CPU produces a write pulse to write a data into the memory after the data from a bus has become fully writable into the memory. The wait signal generator 103 is provided to establish such a wait time. When the CPU 101 accesses the internal memory 102, the wait signal generator 103 causes the CPU 101 to wait for a predetermined time period depending on a rated access time of the memory used. Numeral 2 denotes an auxiliary memory corresponding to the expansion ROM cartridge or RAM cartridge described above, and includes an external memory 201 comprising a ROM or RAM. Usually, the external memory 201 uses memory elements having the same access time as the internal memory 102, and the wait signal generator 103 causes the CPU 101 to wait for the same predetermined time period when the CPU 101 accesses the external memory 201, as it does when the CPU 101 accesses the internal memory 102. Thus, by coupling the auxiliary memory 2 to the main unit 1 of the electronic equipment, the overall function of the system is expanded as if the capacity of the internal memory 102 were expanded. However, such a prior art electronic equipment has the following disadvantage.

The external memory 201 must use memory elements which have equal or higher access time to or than that of the internal memory 102. As described above, recent developments in electronic technology have been remarkable and as for the memory elements, the performance thereof have been rapidly improved, such as increase of memory capacity and increase of operation speed, and various types of memory elements from a low priced one to a high priced one are available depending on the performance. On the other hand, in the electronic equipment, it is necessary that various auxiliary memories are available for one main unit of the electronic equipment depending on purpose of processing by a user and a desired price. In other words, it is desirable that optimum memory elements to the user from standpoints of cost and performance can be used. In the prior art electronic equipment, it is necessary that the access time of the external memory 201 of the auxiliary memory 2 is equal to or shorter than the access time of the internal memory 102 of the main unit 1 of the electronic equipment. Accordingly, freedom of selection of the memory elements used in the auxiliary memory 2 is highly restricted both in price and in performance.

In order to resolve the above problem, the wait time for the CPU in the main unit of the electronic equipment may be set sufficiently long so that auxiliary memories having different rated access times can be selectively used. In this case, however, if a auxiliary memory having short access time memory elements is used to attain a high speed operation, an unnecessarily long wait time is required for the external memory and the inherent performance of the auxiliary memory is not accomplished.

SUMMARY OF THE INVENTION

It is an object of the present invention to provide an electronic equipment which eliminates the above disadvantages.

It is another object of the present invention to provide an improved electronic equipment having a microprocessor and a memory.

It is other object of the present invention to provide an economic and efficient electronic equipment.

It is other object of the present invention to provide a highly flexible electronic equipment.

It is other object of the present invention to provide an electronic equipment having a main unit and a removable auxiliary memory, in which an auxiliary memory having any access time memory elements can be readily combined.

It is other object of the present invention to provide an electronic equipment which can achieve a maximum performance of an auxiliary memory whatever performance type auxiliary memory is selected by a user depending on purpose of processing and price.

It is other object of the present invention to provide an electronic equipment capable of using an auxiliary memory whereby the user has high freedom of selection from standpoints of price and performance depending on purpose of processing.

The other objects of the present invention will be apparent from the following description of the invention taken in conjunction with the accompanying drawings.

DETAILED DESCRIPTION OF THE PREFERRED EMBODIMENTS

Figure 1:
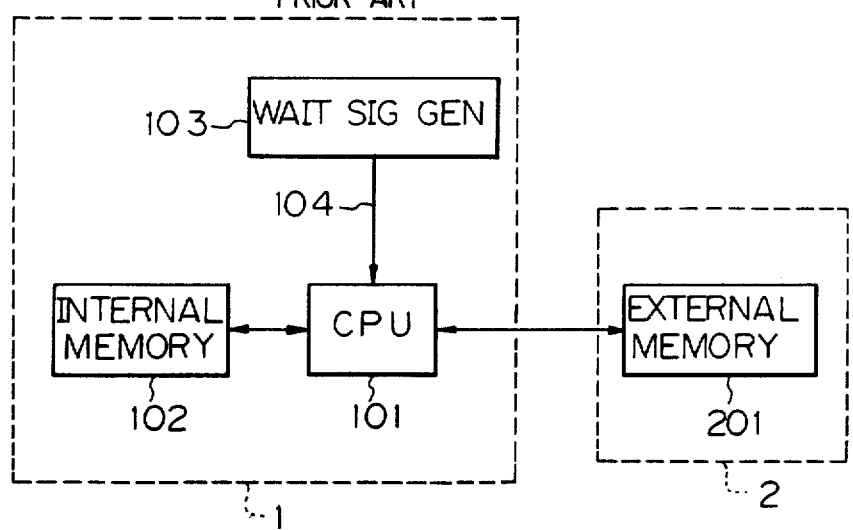
FIG. 1 is a block diagram of a main functional configuration of a prior art electronic equipment.
Figure 2:
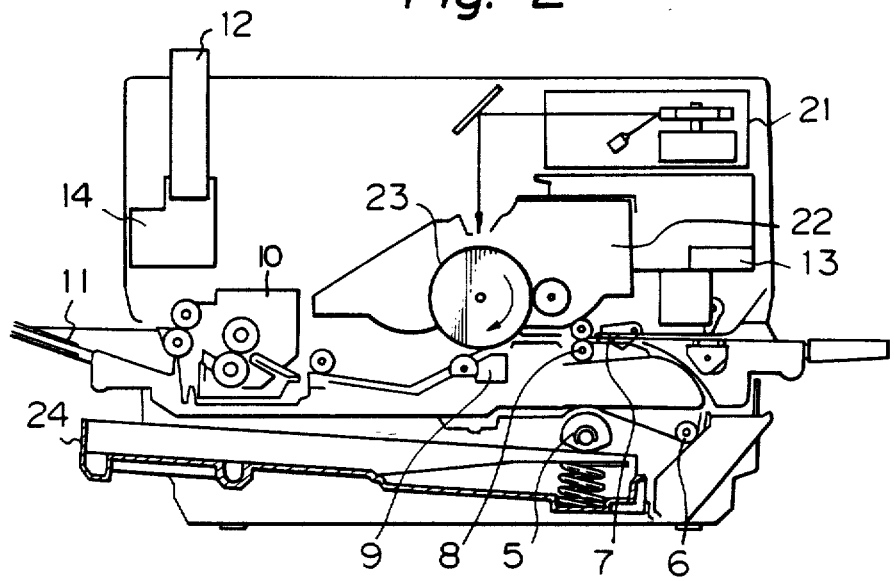
FIG. 2 is a schematic sectional view of a laser beam printer in accordance with the present invention.

FIG. 2 shows a schematic sectional view of a laser beam printer in accordance with the present invention.

Numeral 21 denotes an exposure unit having a scanner and a laser unit, numeral 22 denotes a developing unit for visualizing a latent image formed on a photosensitive drum 23, numeral 24 denotes a paper cassette, numeral 5 denotes a paper feed roller for feeding papers one by one from the paper cassette 24 to a convey roller 6, numeral 7 denotes a registration shutter by which the paper fed by the convey roller 6 is temporarily stopped to synchronize the projection of a laser beam and the rotation of the photosensitive drum 23 with the paper feed, numeral 8 denotes a feed-in roller for feeding the paper into a transfer station 9, numeral 10 denotes a fixing station for fixing a toner image transferred onto the paper, numeral 11 denotes a stacker for stacking ejected papers, and numeral 12 denotes a character generator corresponding to a removable auxiliary memory 4 to be described hereinbelow including a ROM which is used as a character generator.

In the laser beam printer thus constructed, a timing of a series of operations such as paper feed and development is controlled by a sequence controller 13.

Numeral 14 denotes an image processor for converting a code signal sent from a host computer (not shown) to an image signal. The laser beam is turned on and off by a binary signal produced by the image processor 14. The image processor 14 has a font memory which contains a plurality of character fonts in a form of pattern signals, and accesses the font memory by an input code signal to read out a corresponding pattern signal. The character generator 12 is used when a pattern signal other than the character font (pattern signals) stored in the image processor 14 is required. The pattern signal in the character generator 12 is read out by the image processor 14 by applying a code signal thereto. As noted above, the auxiliary memory 4 to be described later corresponds to the character generator 12, and the electronic equipment 3 also to be described hereinbelow is included in the image processor 14.

Figure 3:
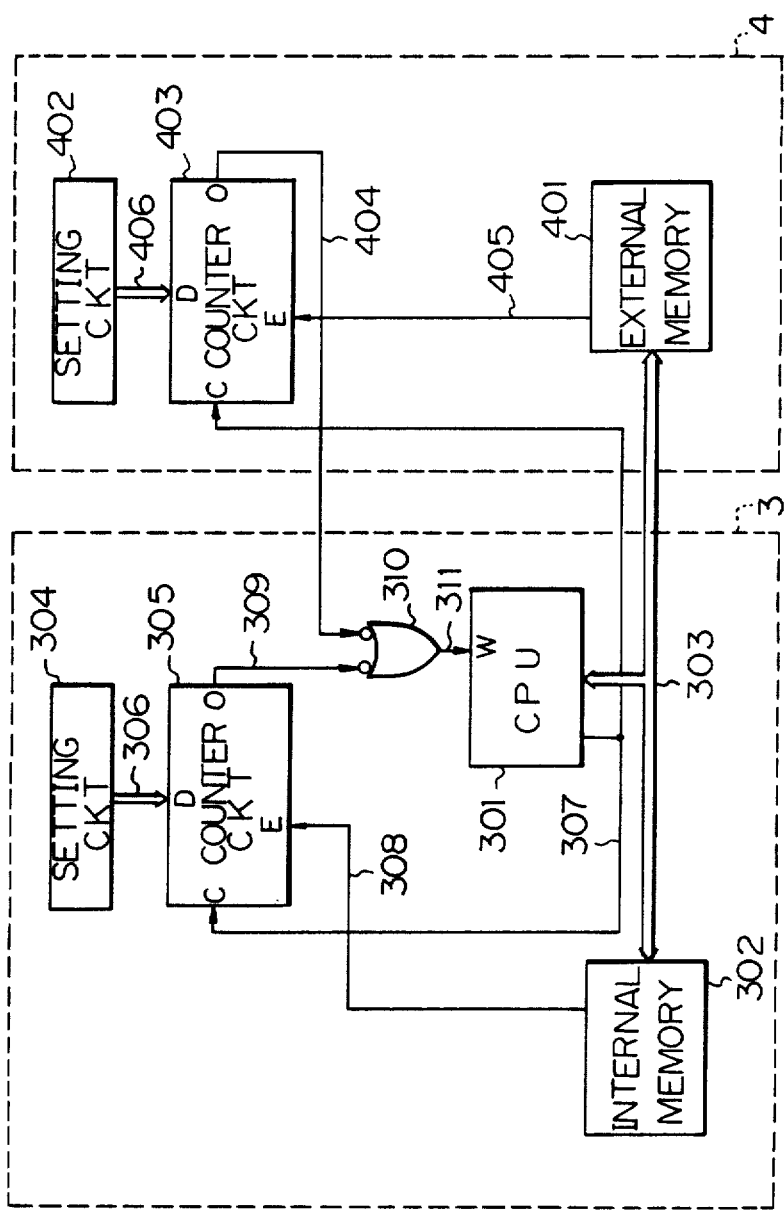
FIG. 3 is a block diagram of a main functional configuration of one embodiment of the electronic equipment of the present invention.

FIG. 3 is a block diagram of a main functional configuration of one embodiment of the electronic equipment of the present invention. Numeral 3 denotes a main unit of the electronic equipment and numeral 4 denotes an auxiliary memory removably mounted to the main unit 3. While not shown in FIG. 3, a conventional keyboard and display can be connected to the main unit 3. In the main unit 3, numeral 301 denotes a central processing unit (CPU) for controlling the electronic equipment, numeral 302 denotes an internal memory of the main unit 3 comprising a RAM and a ROM to be used by the CPU 301, numeral 303 denotes a common memory bus of the CPU 301 comprising a bus line for transferring data and address signals, numeral 304 denotes a setting circuit for setting information on a rated access time of the internal memory 302 and numeral 305 denotes a presettable counter circuit to which an initial count is set from a parallel data input terminal D. Numeral 401 denotes an external memory comprising a RAM or a ROM removably mounted to the internal memory 302, numeral 402 denotes a setting circuit for setting information on a rated access time of the external memory 401, and numeral 403 denotes a presettable counter to which an initial count is set from a parallel data input terminal D.

The operation of the above-described circuit is now described. The CPU 301 accesses the internal memory 302 each time it executes an instruction. If the CPU 301 similarly accesses the external memory 401, the content of the external memory 401 is retrieved. Which one of the memories the CPU 301 accesses is determined by an address signal on the memory common bus 303. Usually, an address of a higher address space is assigned to the external memory 401. Accordingly, the main unit 3 of the electronic equipment properly operates even when the auxiliary memory 4 is not loaded. When a special large program is to be executed or when types of character fonts are to be increased, the auxiliary memory 4 is loaded to the main unit 3. The electrical connection between the main unit 3 and the auxiliary memory 4 is effected by pluggable connector means (not shown). When the auxiliary memory 4 is not loaded, the line of the memory common bus 303 and the line of the signal line 404 which transmits the output signal of the counter 403 are of high impedance. The bus signal level in the main unit 3 is controlled by the main unit. The common memory bus 303 is driven by a three-state device and the signal line 404 is biased such that it is in a logical "1" level unless an external signal is applied thereto. Accordingly, under this condition, the signal on the signal line 404 is always in the logical "1" level. On the other hand, the setting circuit 304 in the main unit 3 always produces a predetermined digital signal. The content thereof is determined by the rated access time of the internal memory 302 and held by a complement of several machine clocks of the CPU 301. The setting circuit 304 always produces a binary code comprising logical "1" and "0" levels and it may be implemented by a microdip switch, a wire encoded chip, etc. The same is true for the setting circuit 402. The setting output of the setting circuit 304 is applied to the parallel data input terminal D of the counter 305 through the line 306. On the other hand, the machine clock from the CPU 301 is always applied to the clock input terminal C of the counter 305 through the line 307. A count enable signal is applied to a count enable terminal E of the counter 305 from the internal memory 302 through the line 308. The count enable signal assumes the logical "1" level whenever the CPU 301 starts to access the internal memory 302. Namely, whenever the address signal on the common memory bus 303 addresses the internal memory 302, the content thereof is decoded by the internal memory 302 to produce a select enable signal of the internal memory 302 and the count enable signal is set to the logical "1" level in synchronism with a predetermined timing signal from the CPU 301. This is true in both the read cycle and the write cycle for the internal memory 302. The content at the parallel data input terminal D is preset into the counter 305 at the rise of the count enable signal and the counter 305 is thereafter counted up until the most significant bit of the counter 305 assumes the logical "1" level. Until the most significant bit of the counter 305 assumes the logical "1" level, the logical "0" level output is supplied to one input terminal of a negative input logic OR gate 310 through an output terminal 0 and a line 309, and an inverted output or a logical "1" level output is applied to a wait input terminal W of the CPU 301. The CPU 301 is in a wait status under this condition. It spends this "dummy" time internally. When the most significant bit of the counter 305 finally assumes the logical "1" level, the counter 305 stops further counting internally and the logical "1" level is supplied to the OR gate 310 through the output terminal 0 and the line 309. Since the logical "1" level is always applied to the other input terminal of the OR gate 310, the inverted logical "0" level output is applied to the wait input terminal W of the CPU 301. Thus, the CPU 301 is released from the wait status. In this operation, the wait signal on the line 311 may be considered as a signal which is set to the logical "1" level at the time of initial setting of the counter 305 (at the time of start of the memory access) and reset to the logical "0" level after a predetermined time period elapses as determined by the counting of the counter 305. When, and only when, the wait signal has logical "1", is the wait operation of the CPU 301 is enabled. The CPU 301 delays a strobe pulse for writing or reading the internal memory 302 by utilizing the wait time. At the end of one memory access cycle to the internal memory 302, the count enable signal on the line 308 is reset to the logical "0" level. When the memory access by the CPU 301 is again requested, the above operation is repeated.

The operation of the external memory 401 in the auxiliary memory 4 is similar to the above. The setting circuit 402 always produces a predetermined digital signal. The content thereof is determined by the rated access time of the external memory 401 and held by a complement of several machine clocks of the CPU 301. The setting output of the setting circuit 402 is applied to the parallel data input terminal D of the counter 403 through the line 406. When the auxiliary memory 4 is connected to the main unit 3, the machine clock from the CPU 301 is supplied to the clock input terminal C of the counter 403 through the line 307. A count enable signal from the external memory 401 is applied to a count enable terminal E of the counter 403 through the line 405. The count enable signal assumes the logical "1" level whenever the CPU 301 starts to access the external memory 401. Namely, whenever the address signal on the memory common bus 303 addresses the external memory 401, the content thereof is decoded by the external memory 401 to produce a select enable signal of the external memory 401, and the count enable signal is set to the logical "1" level in synchronism with a predetermined timing signal from the CPU 301. The subsequent operation is similar to that described for the main unit 3. The wait signal on the line 311 is set to the logical "1" level at the time of initial setting of the counter 403 and reset to the logical "0" level after a predetermined time period elapses as determined by the counting of the counter 403. The high level (logical "1" level) signal is always applied to the line 309. Thus, only during the logical "1" level period of the wait signal on the line 311, the wait operation in the CPU 301 is enabled. In accordance with one preferred mode of the present embodiment, the rated access time of the external memory 401 is longer than the rated access time of the internal memory 302. Namely, the external memory 401 uses memory elements having a relatively long rated memory cycle. Accordingly, the time period during which the wait signal on the line 311 assumes the logical "1" level is longer when the external memory 401 is accessed than when the internal memory 302 is accessed. The CPU 301 does not particularly contribute to the generation and control of the wait signal of different durations. The CPU 301 need only access the internal memory 302 or the external memory 401 in accordance with the execution procedure of the program, as described above. In accordance with another preferred mode of the present embodiment, the rated access time of the external memory 401 is shorter than the rated access time of the internal memory 302. Namely, the external memory uses the memory elements having a relatively short rated memory cycle. Again, in this case, the CPU 301 need only access the internal memory 302 or the external memory 401 in accordance with the execution procedure of the program. Since the setting circuit 402 in this case holds the setting which causes a weight signal having a shorter duration than that of the internal memory 302 to be generated, the internal memory 302 as well as the external memory 401 are accessed with optimum access times, respectively.

The electronic equipment of the present embodiment is used in the following manner. When only the main unit 3 is used and the auxiliary memory 4 is not connected, no inverted signal of the wait signal applied to the OR gate 310 from the counter 403 through the line 404 exists and this level is always biased to the logical "1". Accordingly, when the CPU 301 accesses the internal memory 302, the CPU 301 is caused to wait for a period determined by the setting output of the setting circuit 304. When the auxiliary memory 4 is connected, the CPU 301 is caused to wait for an appropriate time determined by the setting outputs of the setting circuit 304 or 402 when the CPU 301 accesses the internal memory 302 or the external memory 401. Accordingly, regardless of any differences there may be between the rated access times of the memory elements used in the internal memory 302 and the external memory 401, the CPU 301 can efficiently read or write both memories with an optimum wait time. When another auxiliary memory 4' (not shown) which uses memory elements having a different rated access time is connected as an external memory 401' (not shown), the CPU 301 can read or write the internal memory 302 or the external memory 401' again with an optimum access time in accordance with the setting in a setting circuit 402' (not shown).

In the above embodiment, the inverted signals of the wait signals of different durations are ORed by the OR gate 310 and the output thereof is supplied to the CPU 301. Another embodiment of the present invention is shown in FIG. 4, in which the like elements to those shown in FIG. 3 are designated by the like numerals.

Instead of using the OR gate 310 of FIG. 3, a line selector 312 is used which selects one of input signals from a plurality of lines comprising lines 309, 404 etc. by a select signal supplied from the CPU 301 through a line 313. The CPU 301 may previously store in the line selector 312 the select signals representing the use of the internal memory 302, the external memory 401 or the parallelly connected external memory 401' (not shown), if any, and access one of the memories corresponding to the selected line. In this case, there is no need for a decode function in which the memories 302 and 401 decode the address signal on the memory common bus 303 and supply the count enable signal to the line 308 or 405 only when their own memories are accessed. Accordingly, in this case, whichever memory the CPU 301 accesses, all of the counters 305, 403, . . . are started. However, since the line selector 312 selects only the wait signal corresponding to one of the memories, each memory can be accessed with an optimum access time as is done in the embodiment of FIG. 3.

Figure 4:
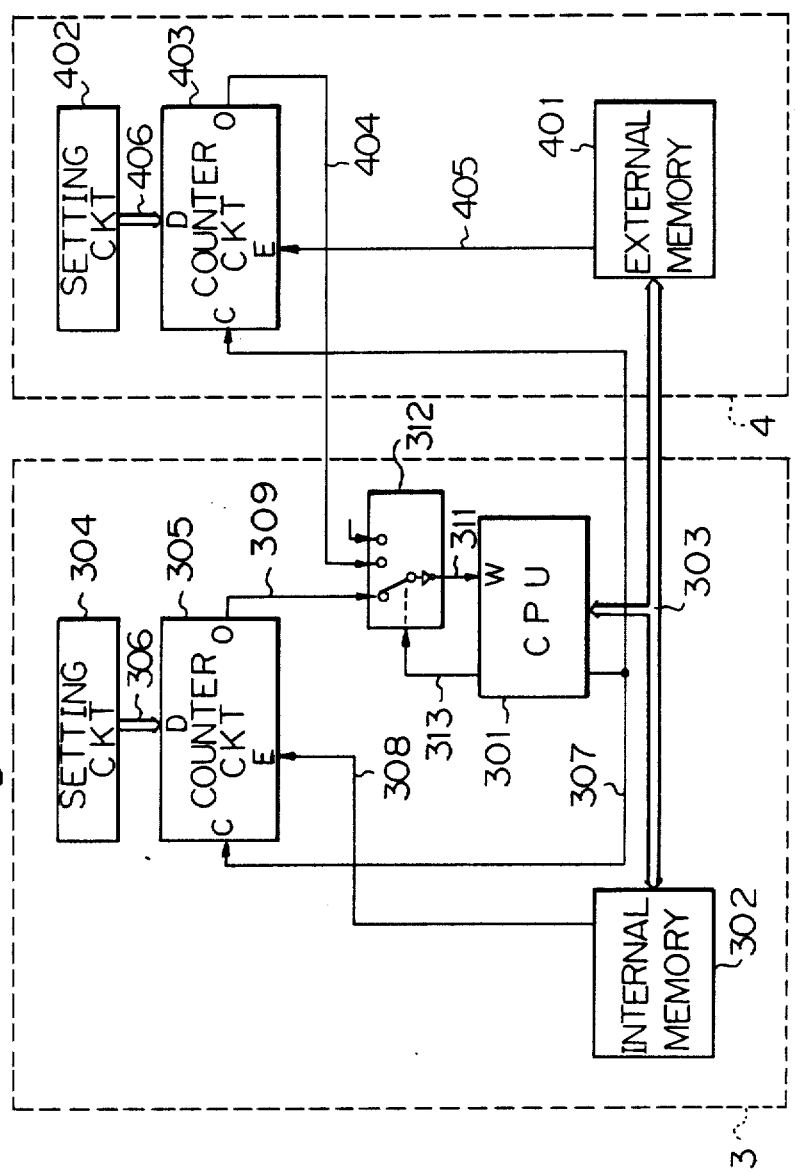
FIG. 4 is a block diagram of a main functional configuration of another embodiment of the electronic equipment of the present invention.

In the embodiments of FIGS. 3 and 4, when a plurality of auxiliary memories having external memories 401 of different characteristics are parallelly connected, the number of input terminals of the OR gate 310 is increased or the number of input terminals of the line selector 312 is increased so that the wait signals supplied by the respective auxiliary memories are appropriately supplied to the wait input terminal of the CPU 301. In this manner, all memories can be accessed with the optimum access times.

In the electronic equipment of the above-described embodiments, the main unit 3 and the auxiliary memory 4 may be connected in union instead of removably.

Figure 5:
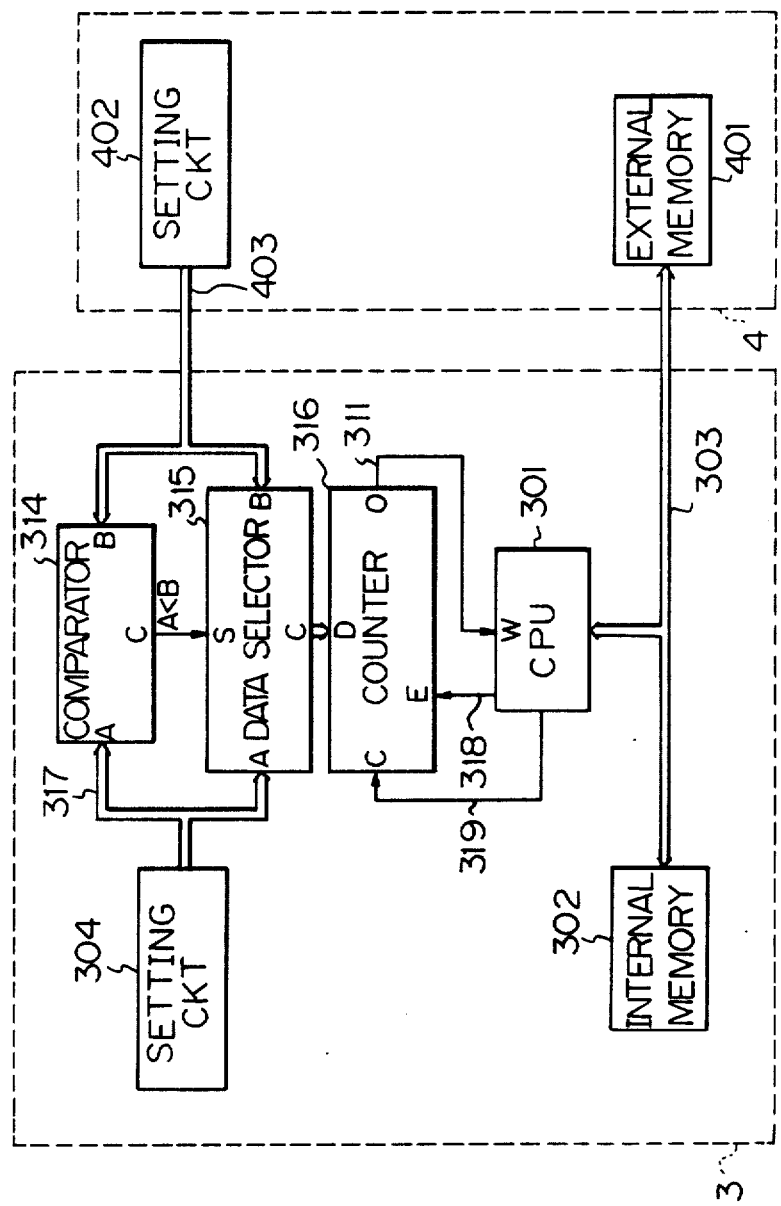
FIG. 5 is a block diagram of a main functional configuration of another embodiment of the electronic equipment of the present invention.

Another embodiment of the present invention is shown in FIG. 5 in which the like elements to those shown in FIGS. 3 and 4 are designated by the like numerals.

FIG. 5 is a block diagram of a main configuration of another embodiment of the electronic equipment of the present invention. Numeral 3 denotes an electronic equipment main unit, and numeral 4 denotes an auxiliary memory removably mounted to the main unit 3. While not shown in FIG. 5, a conventional keyboard and display may be connected to the main unit 3. In the main unit 3, numeral 301 denotes a central processing unit (CPU) which controls the electronic equipment, numeral 302 denotes an internal memory of the main unit 3 comprising a ROM and a RAM used by the CPU 301, numeral 303 denotes a common memory bus of the CPU 301 which comprises a bus for transferring data and address signals, numeral 304 denotes a setting circuit for setting information on a rated access time of the internal memory 302, numeral 314 denotes a comparator which compares magnitudes of digital information applied to input terminals A and B and produces a compare result at an output terminal C, numeral 315 denotes a data selector which selects one of digital information applied to input terminals A and B in accordance with a level of a signal applied to a select input terminal S and provides the selected digital information to an output terminal C, and numeral 316 denotes a presettable counter to which an initial count is set from a parallel data input terminal D. Numeral 401 denotes an external memory comprising a RAM or ROM removably mounted to the internal memory 302, and numeral 402 denotes a setting circuit which sets information on a rated access time of the external memory 401.

The operation of the above circuit is now described. The CPU 301 usually accesses the internal memory 302 each time it executes an instruction. When the CPU 301 similarly addresses the external memory 401, the content of the external memory 401 is read out. Which one of the memories the CPU 301 accesses is determined by the content of the address on the common memory bus 303. Usually, addresses in a higher address space are assigned to the external memory 401. Accordingly, the main unit 3 of the electronic equipment properly operates even when the auxiliary memory 4 is not loaded. However, when a special large program is to be executed or the number of types of character fonts is to be increased, the auxiliary memory 4 is connected to the main unit 3. The electrical connection of the main unit 3 and the auxiliary memory 4 is effected by pluggable connector means (not shown). When the auxiliary memory 4 is not loaded, the line of the memory common bus 303 and the line of the setting supply bus 403 which transmits the output of the setting circuit 402 are of high impedance. The main unit 3 controls the bus signal levels under this condition. For example, the memory common bus 303 is driven by a three-state device and the setting supply bus 403 is biased to a logical "0" level unless an external signal is applied to the bus. Accordingly, under this condition, the data on the setting supply bus 403 is "0". On the other hand, the setting circuit 304 in the main unit 3 always produces a predetermined digital information. The content thereof is determined by the rated access time of the internal memory 302 and it holds several machine clocks of the CPU 301. The setting circuit 304 always produces a binary code comprising logical "1" and "0" levels. It may be implemented by a microdip switch or a wire encoded chip. The same is true for the setting circuit 402. The setting output of the setting circuit 304 is supplied to the input terminals A of the comparator 314 and the data selector 315 through the setting supply bus 317. On the other hand, the setting of the setting circuit 402 is determined by the rated access time of the external memory 401 and the output therefrom is supplied to the other input terminals B of the comparator 314 and the data selector 315. The comparator 314 compares magnitudes of the data supplied to the input terminals A and B and produces a logical "1" level output at an output terminal C when A<B. The data selector 315 selects out the input data at the input terminal A to the output terminal C when the select input signal is logical "0" level, and selects out the data at the input terminal B to the output terminal C when the select input signal is logical "0" level. Accordingly, when the setting in the setting circuit 402 is larger than the setting in the setting circuit 304, the output from the data selector 315 is output from the setting circuit 402. This means that the rated access time of the external memory 401 is longer than that of the internal memory 302. On the other hand, when the setting in the setting circuit 402 is smaller than the setting in the setting circuit 304, the setting in the setting circuit 304 is outputted by the data selector 315. This condition takes place when the external memory 401 uses short access time memory elements or when the auxiliary memory 4 is removed from the main unit 3. The counter 316 generates a wait signal to be supplied to the CPU 301 under the control of a signal from the CPU 301. The machine clock from the CPU 301 is always supplied to a clock input terminal C of the counter 316 through a line 311. A count enable signal from the CPU 301 is supplied to a count enable terminal E of the counter 307 through a line 318. The count enable signal is set to logical "1" level whenever the CPU 301 starts to access the memory. The data at the data input terminal D of the counter 316 is preset to the counter 316 at the rise of the count enable signal and the counter 316 is thereafter counted down until all bits of the counter 316 assume logical "0". When all bits of the counter 316 assume logical "0", a decode output (borrow signal) is logical "1" and it is supplied to the wait input terminal W of the CPU 301 through the output terminal 0 and the line 311. At the rise of the wait signal to the logical "1" level, the count enable signal on the line 318 is reset to the logical "0" level and the subsequent count operation is disabled. In this operation, the wait signal may be considered as a signal which is reset to the logical "0" level at the time of initial setting of the counter 316 (at the time of start of the memory access) and again set to the logical "1" level after the elapse of the predetermined time period by the counting of the counter. The wait operation in the CPU 301 is enabled only during the logical "0" level period of the wait signal. The CPU 301 delays a strobe pulse for writing or reading the memory by utilizing the wait time.

Usually, a static RAM or ROM properly operates when it is accessed more slowly than its rated access time. The same is true for a dynamic RAM provided that it is properly refreshed. Accordingly, even when the rated memory access time of the external memory 401 is longer than the rated memory access time of the internal memory 302, both memories can be accessed with the rated memory access time of the external memory 401.

The electronic equipment of the present embodiment may be used in the following manner. When only the main unit 3 is used and the auxiliary memory 4 is not connected, the setting signal supplied from the setting circuit 402 to the comparator 314 does not exist and this signal is "0". Accordingly, when the CPU 301 accesses the internal memory 302, the CPU 301 is caused to wait for a timer period determined by the setting output of the setting circuit 304. When the auxiliary memory unit 4 is connected, the CPU 301 is caused to wait for a time period corresponding to the larger one of the setting outputs of the setting circuits 304 and 402 when the CPU 301 accesses the internal memory 302 or the external memory 401. Accordingly, regardless of any differences there may be between the rated access times of the memory elements used in the internal memory 302 and the external memory 401, the CPU 301 can properly read or write both memories with the same wait time in accordance with the longer access time. When another auxiliary memory 4' (not shown) which uses other memory elements having a different access time is connected as an external memory 401' (not shown), the CPU 301 can properly read or write the internal memory 302 and the external memory 401' (not shown) in accordance with a setting output of a setting circuit 402' (not shown).

In the above embodiment, the comparator 314 for comparing the magnitudes of the wait times for the CPU 301 and associated circuits are included in the main unit 3 of the electronic equipment. Alternatively, they may be arranged in the auxiliary memory 4 and the setting output of the setting circuit 304 may be supplied to the auxiliary memory 4 through a removable mechanism so that the wait signal is transmitted from the auxiliary memory 4 to the CPU 301.

In electronic equipment in which a plurality of auxiliary memories are parallelly connected, all of setting outputs of the wait times may be required for the internal memory 302 and the plurality of parallel-connected external memories are compared so that the wait time for the CPU 301 is optimally controlled. In this case, three setting output data A, B, and C, for example, are grouped into two-data sets (A, B), (B, C) and (C, A), they are parallely compared by separate comparators, and the compare outputs of the comparators are combined by a gate to detect a maximum one of the three setting output data A, B and C.

In the above embodiment, the electronic equipment may include the main unit 3 and the auxiliary memory 4 in union instead of removably.

The present invention is not limited to the illustrated embodiment but various modifications may be made within a scope of the appended claims.

What I claim is:

1. An electronic equipment comprising:
   information processing means;
   first memory means accessible by said information processing means;
   first output means operatively responsive to said first memory means for outputting a first signal representing a rated access time of said first memory means;
   second memory means accessible by said information processing means, said second memory means being detachable from said equipment;
   second output means operatively responsive to said second memory means for outputting a second signal representing a rated access time of said second memory means;
   wherein said second output means is detachable from said equipment; and
   control means connected to said information processing means for controlling an operation of said information processing means in response to the first signal when said information processing means accesses said first memory means, and for controlling an operation of said information processing means in response to the second signal when said information processing means accesses said second memory means,
   said control means including wait signal generating means for entering the first or second signal from said first or second output means, respectively, and for generating a wait signal for causing said information processing means to be in a wait condition, said wait signal having a waiting time period different in dependence upon the entered first or second signal,
   said wait signal generating means including means for counting a time in response to the entered first or second signal, said time counting means sending the wait signal to said information processing means in accordance with a time count operation.

2. An electronic equipment according to claim 1, wherein said first memory means and said second memory means contain pattern signals of character fonts.

3. An electronic equipment according to claim 1, wherein said control means sends a control signal for controlling an access time in response to the first and second signals representing the rated access time, respectively, only when said first and second memory means are accessed, respectively.

4. An electronic equipment wherein said control means includes selecting means for selecting the first signal from said first output means when said first memory means is accessed, and for selecting the second signal from said second output means when said second memory means is accessed.

5. An electronic equipment comprising:

information processing means;

first memory means accessible by said information processing means;

first output means operatively responsive to said first memory means for outputting a first signal representing a rated access time of said first memory means;

second memory means accessible by said information processing means;

second output means operatively responsive to said second memory means for outputting a second signal representing a rated access time of said second memory means;

wherein said second memory means and said second output means are detachable from said equipment; and control means connected to said information processing means for controlling an operation of said information processing means in response to the first signal when said information processing means accesses said first memory means, and for controlling an operation of said information processing means in response to the second signal when said information processing means accesses said second memory means;

said control means including delay signal generating means for entering the first or second signal from said first or second output means and for generating a delay signal delaying operation of said information processing means;

wherein said delay signal generating means includes first and second counter means enabled only when said first memory means and said second memory means are selected, respectively, for counting time periods corresponding to the rated access times of said first memory means and said second memory means, respectively, and wherein said delay signal generating means generates said delay signal corresponding to a count operation by said first or second counter means.

6. An electronic equipment comprising:

information processing means;

first memory means accessible by said information processing means;

first output means operatively responsive to said first memory means for outputting a first signal representing a rated access time of said first memory means;

second memory means accessible by said information processing means;

second output means operatively responsive to said second memory means for outputting a second signal representing a rated access time of said second memory means;

wherein said second memory means and said second output means are detachable from said equipment; and control means for controlling an operation of said information processing means in response to the first signal when said information processing means accesses said first memory means, and for controlling an operation of said information processing means in response to said second signal when said information processing means accesses said second memory means;

wherein said control means includes first and second count means for determining timings of accessing said first and said second memory means by said information processing means, said first and second count means performing counting operations in response to the first and second signals at the time period corresponding to the rated access time of said first and second memory means, respectively.

7. An electronic equipment comprising:

information processing means;

first memory means accessible by said information processing means;

second memory means accessible by said information processing means, said second memory means being different in access time from said first memory means;

first output means operatively responsive to said first memory means for outputting a first signal corresponding to a rated access time of said first memory means and second output means operatively responsive to said second memory means for outputting a second signal corresponding to a rated access of said second memory means;

wherein said second memory means and said second output means are detachable from said equipment; and control means for controlling an operation of said information processing means so that said information processing means can access first and second memory means at respective different timings;

wherein said control means controls an access timing of said information processing means in response to the first signal when said information processing means accesses said first memory means, and controls an access timing of said information processing means in response to the second signal when said information processing means accesses said second memory means;

wherein said control means includes counter means, said counter means performing counting operations in response to a selected one of the first and second signals; and wherein said control means inhibits accessing of said first and second memory means, respectively, by said information processing means while said counter means performs its counting operation in response to the selected one of the first and second signals.

8. An electronic equipment according to claim 7, wherein said counter means includes first and second counters corresponding to the respective first and second memory means, and said first and second counters perform counting operations in response to the first and second signals, respectively, wherein said control means inhibits accessing of said first and said second memory means by said information processing means while said first and said second counter means, respectively, performs its counting operation, and wherein said second counter is detachable from said equipment.

* * * * *

UNITED STATES PATENT AND TRADEMARK OFFICE
CERTIFICATE OF CORRECTION

PATENT NO. : 4,956,804
DATED : September 11, 1990
INVENTOR(S) : Kozo Matsumoto

It is certified that error appears in the above-identified patent and that said Letters Patent is hereby corrected as shown below:

Title page:

At [56] References Cited

U.S. Patent Documents,
        "4,159,517  1/1979  Paradine" should read
        --4,159,517  6/1979  Paradine--.

Column 12, "the time" should read --a time--.

Signed and Sealed this

First Day of September, 1992

Attest:

DOUGLAS B. COMER

Attesting Officer      Acting Commissioner of Patents and Trademarks